US005124525A

United States Patent [19]

Severance, Jr. et al.

[11] Patent Number: 5,124,525

[45] Date of Patent: Jun. 23, 1992

[54] PLASMA ARC TORCH HAVING IMPROVED NOZZLE ASSEMBLY

[75] Inventors: Wayne S. Severance, Jr.; Tommie Z. Turner; Larry W. Stokes, all of Florence, S.C.

[73] Assignee: ESAB Welding Products, Inc., Florence, S.C.

[21] Appl. No.: 750,517

[22] Filed: Aug. 27, 1991

[51] Int. Cl.$^5$ .......... B23K 9/00

[52] U.S. Cl. .......... 219/121.5; 219/121.51; 219/75; 219/121.48

[58] Field of Search .......... 219/121.5, 121.48, 121.52, 219/74, 73, 121.51

[56] References Cited

U.S. PATENT DOCUMENTS

| | | | |
|---|---|---|---|
| 3,619,549 | 11/1971 | Hogan | 219/121.5 |
| 3,641,308 | 2/1972 | Couch, Jr. et al. | 219/121.5 |
| 4,311,857 | 1/1982 | Yerushalmy | 219/121.5 |
| 4,421,970 | 12/1983 | Couch, Jr. | 219/121.5 |
| 4,701,590 | 10/1987 | Hatch | 219/121.52 |
| 4,782,210 | 11/1988 | Nelson et al. | 219/121.52 |
| 4,861,962 | 8/1989 | Sanders | 219/121.5 |
| 4,954,688 | 9/1990 | Winterfeldt | 219/121.5 |
| 5,023,425 | 6/1991 | Severance, Jr. | 219/121.48 |

*Primary Examiner*—Mark H. Paschall
*Attorney, Agent, or Firm*—Bell, Seltzer, Park & Gibson

[57] ABSTRACT

A plasma arc torch is disclosed and includes an electrode defining a discharge end and a longitudinal axis. A nozzle base, formed of metallic material, is positioned adjacent the discharge end of the electrode. The nozzle base has an outer, annular configured mounting surface and a frusto-conical surface positioned adjacent the mounting surface and tapering toward the longitudinal axis in a direction away from the electrode. A lower nozzle member, formed of metallic material, is secured onto the nozzle base mounting surface on the side opposite the electrode, and includes an interior surface spaced from the outer frusto-conical surface of the nozzle base to form a water passage. A ceramic insulator is secured onto the outer surface of the lower nozzle member and extends substantially along that surface for preventing double arcing and insulating the lower nozzle member from heat and plasma generated during torch operation. In a one embodiment the ceramic insulator is secured by means of glue. In another embodiment, the ceramic insulator is secured by an O-ring.

20 Claims, 3 Drawing Sheets

PLASMA ARC TORCH HAVING IMPROVED NOZZLE ASSEMBLY

FIELD OF THE INVENTION

This invention relates to a water assisted plasma arc torch having a metallic nozzle base, a metallic lower nozzle member secured onto the nozzle base, and a ceramic insulator secured onto the lower nozzle member and extending substantially along the surface of the lower nozzle member for preventing double arcing and insulating the lower nozzle member from heat and plasma generated during torch operation.

BACKGROUND OF THE INVENTION

In one commercially available prior art plasma arc torch design, the nozzle assembly includes a nozzle base fabricated from copper or copper alloy and a lower nozzle member fabricated from a ceramic material. The lower nozzle member is glued onto the nozzle base. Both the nozzle base and the lower nozzle member include a bore aligned longitudinally with the longitudinal axis defined by the electrode. An electric arc created by the electrode extends from the discharge end of the electrode through the bores to a workpiece located below the lower nozzle member, while a vortical flow of gas generated between the electrode and the nozzle base creates a plasma flow outwardly through the bores and to the workpiece. An annular water passage is defined between the nozzle base and the lower nozzle member. A jet of water introduced into the passage in surrounding relation to the plasma arc constricts the plasma for better torch operation.

A ceramic composition for the lower nozzle member is desirable in this prior art plasma arc torch because during cutting, the ceramic provides protection from double arcing and insulates the nozzle assembly from heat and plasma generated during torch operation. For example, during cutting, the operator may accidentally move the lower nozzle member into contact with the workpiece. If the lower nozzle member here formed of a metallic material, the torch would be grounded resulting in arc failure as well as possible heat damage.

Additionally, the ceramic composition is desirable to prevent double arcing from the nozzle assembly onto the metallic cup shield mounted on the torch body. The cup includes a forward end having a lip engaging a shoulder on the lower nozzle member. The cup retains the lower nozzle member and the nozzle base in position. Typically the cup is at a potential lying between the electrode and the work. Without the benefit of the ceramic lower nozzle to insulate the cup, there is a larger likelihood that the arc will jump onto the cup.

Although the ceramic lower nozzle member is advantageous because it insulates and resists arcing, a lower nozzle member formed of a ceramic material has several disadvantages. Ceramic materials are difficult to machine or form into high precision parts at a reasonable cost. If close tolerances are desired, expensive forming, machining and fabrication techniques must be adapted. Unless these expensive machining, forming and fabrication techniques are adapted, The desired concentricity and precision of the lower ceramic nozzle member cannot be obtained.

As a result, often during the volume manufacture of nozzle parts, the lower nozzle member has an undesired eccentricity, and the spacing between the lower nozzle member and the nozzle base is inconsistent forming an eccentric, imprecise water passage. The eccentricity in the water passage creates an irregular water spray pattern during torch operation, resulting in ripples forming on the cut surface and beveled cut edges varying in a cut angle.

Additionally, ceramic parts are not well adapted for close tolerance interference fits. Thus, as in the above prior art torches, the ceramic lower nozzle must be glued onto the nozzle base. This low tolerance gluing is not as preferred as securing of the members by the close tolerance interference fits commonly used in metal-to-metal interfaces. Also, ceramic parts typically have poor surface finishes that create irregularities in water spray patterns.

SUMMARY OF THE INVENTION

It is therefore an object of the present invention to provide a plasma arc torch that is fabricated to provide a nozzle base, and a lower nozzle member secured to the nozzle base in which closer manufacturing tolerances can be obtained between the nozzle base and lower nozzle member to create a more concentric water passage between the nozzle base and the lower nozzle member.

It is another object of the present invention to provide a plasma arc torch having a lower nozzle member formed from a metallic material to obtain closer tolerances in the water passage formed between the lower nozzle member and the nozzle base.

It is another object of the present invention to provide a plasma arc torch having a nozzle base and lower nozzle member both formed of a metallic material and in which the lower nozzle member includes a ceramic insulator secured onto the lower surface of the lower nozzle member for insulating the lower nozzle member and nozzle base and preventing double arcing.

It is another object of the present invention to provide a plasma arc torch having a nozzle base and lower nozzle member both formed of a metallic material and in which the lower nozzle member can be press fitted onto the nozzle base.

It is another object of the present invention to provide a nozzle assembly for a plasma arc torch having a nozzle base and lower nozzle member both formed of a metallic material to obtain closer manufacturing tolerances between the nozzle base and the lower nozzle assembly.

It is another object of the present invention to provide a nozzle assembly for a plasma arc torch having a nozzle base and lower nozzle assembly both formed of a metallic material in which the lower nozzle assembly includes a ceramic insulator secured onto the lower nozzle member for insulating the lower nozzle member and preventing double arcing.

The present invention provides for a plasma arc torch in which the lower nozzle member is constructed to provide close tolerances to maintain a more concentric water passage and prevent an irregular water spray pattern during torch operation. The lower nozzle member is formed of a metallic material, which not only provides for close tolerances, but also provides for a more desirable close tolerance press fit onto the nozzle base as compared to the undesirable, prior art gluing methods.

In accordance with the present invention, the plasma arc torch includes an electrode defining a discharge end and a longitudinal axis. A nozzle base is formed of a metallic material and is mounted adjacent the discharge end of the electrode. The nozzle base has a bore therethrough which is aligned with the longitudinal axis and through which the plasma is ejected. The nozzle base has an outer mounting surface and outer frusto-conical surface positioned adjacent the mounting surface and tapering toward the longitudinal axis in a direction away from the electrode.

A lower nozzle member, formed of metallic material, is secured onto the mounting surface. The lower nozzle member has an opening aligned with the longitudinal axis and positioned adjacent the bore. An interior surface of the lower nozzle member is spaced from the outer frusto-conical surface of the nozzle base to form an angled water passage.

A ceramic insulator is secured onto the lower nozzle member and extends substantially along the outer surface of the lower nozzle member for preventing double arcing and insulating the lower nozzle member from heat and plasma generated during torch operation. In one embodiment, the ceramic insulator is glued onto the lower nozzle member. In another embodiment, the ceramic insulator is retained onto the lower nozzle member by an O-ring, which engages a shoulder of the ceramic insulator and a shoulder on the lower nozzle member.

During torch operation, an electrical arc extends from the electrode and through the bore and opening to a workpiece located adjacent the side of the lower nozzle member. A vortical flow of gas is generated between the electrode and the nozzle base to create a plasma flow outwardly through the bore and opening to the workpiece. A jet of liquid is introduced into the water passage and is forced outward from the water passage toward the plasma to envelope the plasma as it passes through the bore.

In a preferred embodiment, the mounting surface is of substantially annular configuration and comprises stepped vertical and horizontal shoulder portions forming an annular plenum chamber communicating with the water passage and into which water is injected. Preferably, the lower nozzle member includes an annular collar portion dimensioned for an interference fit with the mounting surface. The nozzle base also includes an interior frusto-conical surface tapering inward toward the bore in a direction away from the electrode. The water passage includes a vertical annulus defined between the nozzle base and the lower nozzle member. The distance between the nozzle base and the lower nozzle member is about 0.003 to about 0.010 inches. The lower opening has a diameter of between about 0.160 to about 0.170 inches. The preferred water passage distance between the outer frusto-conical surface and the interior surface is between about 0.010 to about 0.020 inches.

The plasma arc torch includes a torch body. An outer cup shield is mounted on the torch body and includes a forward end having a lip. The ceramic insulator includes an annular shoulder and the lip engages the annular shoulder on the ceramic insulator for retaining the ceramic insulator, the lower nozzle member and the nozzle base in position.

In a preferred embodiment, the electrode includes an elongate, metallic tubular holder supported by the torch body. The holder has a front face along the longitudinal axis. An insert is mounted in the cavity for emitting electrons upon an electric potential being applied thereto.

BRIEF DESCRIPTION OF THE DRAWINGS

Some of the objects and advantages of the present invention having been stated, others will appear as the description proceeds, when taken in conjunction with the accompanying drawings, in which.

DETAILED DESCRIPTION OF THE PREFERRED EMBODIMENT

Figure 1:
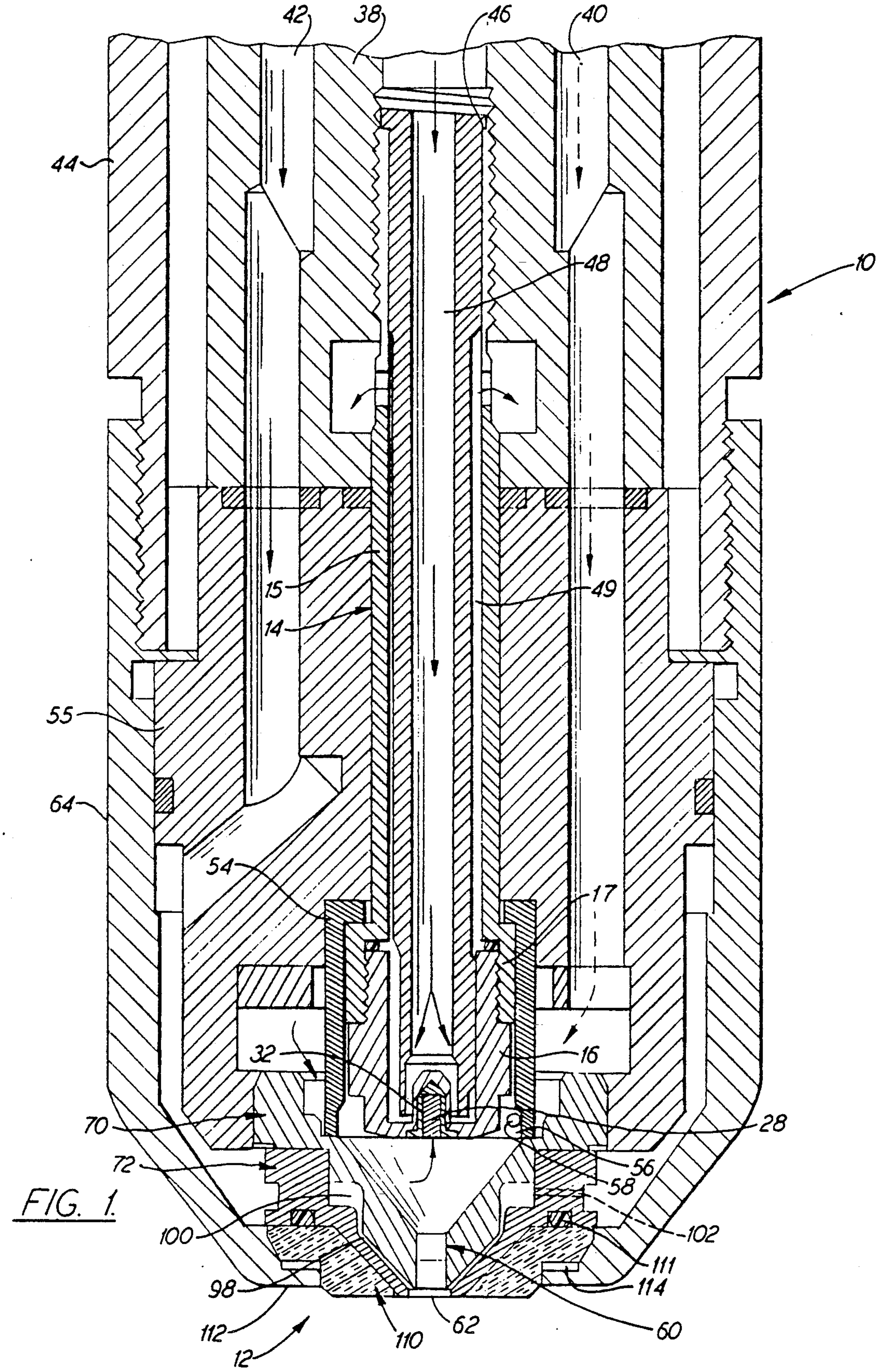
FIG. 1 is a sectioned, side elevation view of a plasma arc torch that embodies the features of the present invention.
Figure 2:
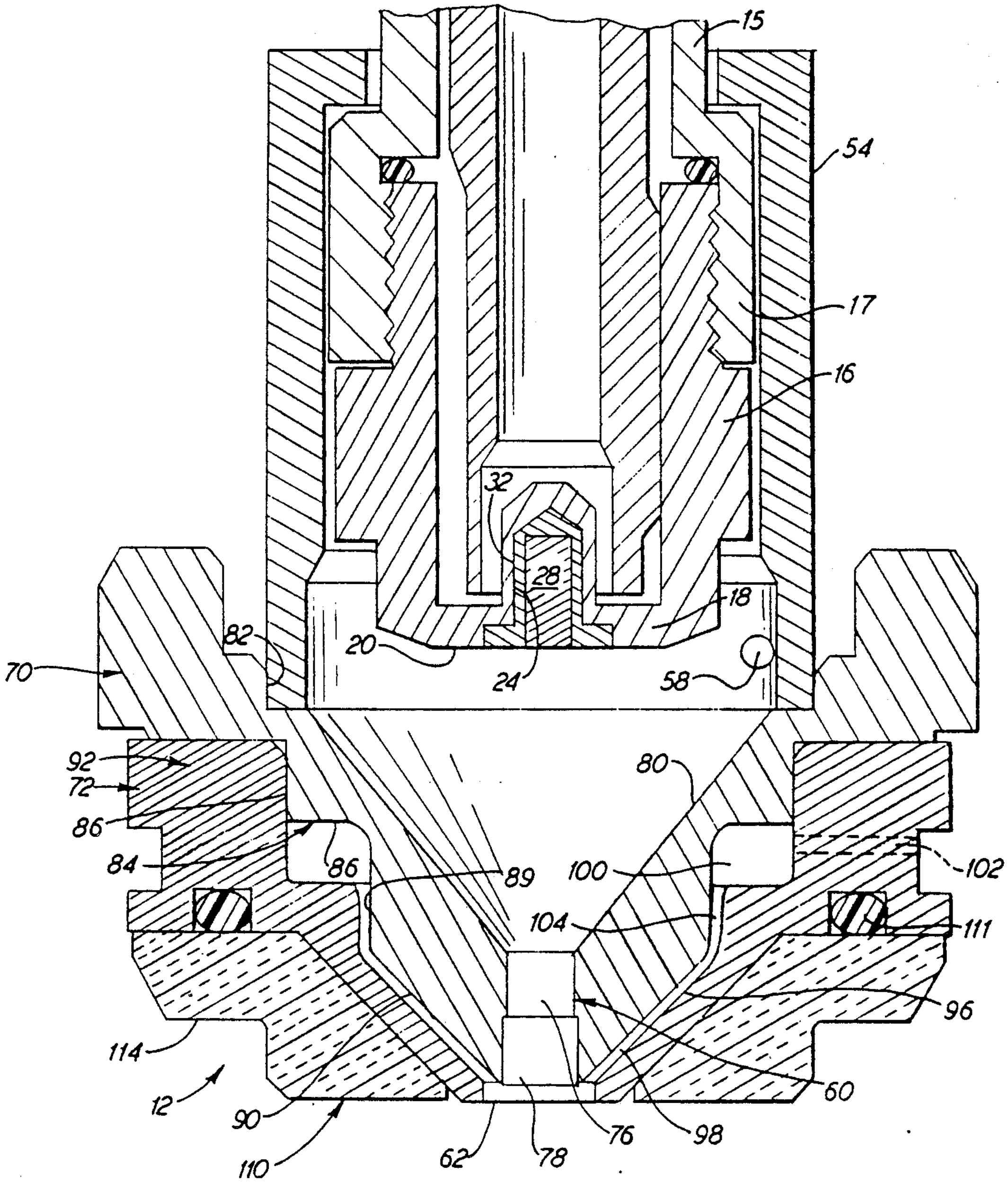
FIG. 2 is a somewhat enlarged fragmentary sectional view of the lower portion of a plasma arc torch and illustrating the nozzle assembly in accordance with the present invention.

Referring now to the drawings, and more particularly to FIG. 1, there is disclosed a plasma arc torch 10 in accordance with the present invention. The plasma arc torch 10 includes a nozzle assembly 12 and a tubular electrode 14 defining a longitudinal axis. The electrode 14 is preferably made of copper or a copper alloy, and it is composed of an upper tubular member 15 and a lower member or holder 16. The member 15 also includes an internally threaded lower end portion 17. The holder 16 also is of tubular construction, and it includes a lower front end and an upper rear end as seen in FIGS. 1 and 2. A transverse end wall 18 (FIG. 2) closes the front end of the holder 16. The transverse end wall 18 defines an Outer front face 20. The rear end of the holder is externally threaded and is threadedly joined to the lower end portion 17 of the upper tubular member.

The holder 16 is open at the rear end so that the holder is of cup shaped configuration and defines an internal cavity 24 (FIG. 2). An insert 28 is mounted in the cavity 24 and is disposed coaxially along the longitudinal axis. The emissive insert 28 is composed of a metallic material having a relatively low work function, preferably in the range of between about 2.7 to about 4.2 ev, to readily emit electrons upon an electric potential being applied thereto. Suitable examples of such materials are hafnium, zirconium, tungsten and alloys thereof. A relatively non-emissive sleeve 32 is positioned in the cavity 24 coaxially about the emissive insert 28. The sleeve is composed of a metallic material having a work function which is greater than that of the material of the holder, and also greater than that of the material of the emissive insert. Further information concerning the electrode and insert are found in U.S. Pat. No. 5,023,425, issued Jun. 11, 1991, and assigned to the present assignee, ESAB Welding Products, Inc. of Florence, S.C.

In the illustrated embodiment, as shown in FIG. 1, the electrode 14 is mounted in a plasma arc torch body 38, which has gas and liquid passageways 40 and 42. The torch body 38 is surrounded by an outer insulated housing member 44.

A tube 46 is suspended within the central bore 48 of the electrode 14 for circulating a liquid medium such as water through the electrode structure 14. The tube is a diameter smaller than the diameter of the bore 48 to provide a space 49 for the water to flow upon discharge from the tube 46. The water flows from a source (not shown) through the tube 46, and back through the space 49 to an opening of the torch body and to a drain hose (not shown). The passageway 42 directs the injection water into the nozzle assembly 12 where it is converted into a swirling vortex for surrounding the plasma arc as will be explained in more detail below.

The gas passageway 40 directs gas from a suitable source (not shown), through a conventional gas baffle 54 of any suitable high temperature ceramic material into a gas plenum chamber 56 via inlet holes 58. The inlet holes 58 are arranged so as to cause the gas to enter the plenum chamber 56 in a swirling fashion as is well-known. The gas flows out from the plenum chamber 56 through the arc constricting bore 60 and opening 62 of the nozzle assembly 12. The electrode 14 upon being connected to the torch body 38 holds in place the ceramic gas baffle 54 and a high temperature plastic insulating member 55. The member 55 electrically insulates the nozzle assembly 12 from the electrode 14. An outer cup shield 64 is threadedly mounted on the torch body and engages the nozzle assembly 12 to retain the nozzle assembly 12 in position and protect component parts of the nozzle assembly.

Referring now to FIG. 2, the nozzle assembly 12 is illustrated in detail. The nozzle assembly 12 includes a nozzle base 70 and a lower nozzle member 72. The nozzle base 70 is formed from copper or a copper alloy, and includes a substantially cylindrical body portion. The arc constricting bore 60 extends through the lower end of the nozzle base 70 and is aligned with the longitudinal axis defined by the electrode. The bore 60 includes a first bore section 76 positioned toward the electrode and a second bore section 78 defining the exit end of the bore and having a diameter greater than the diameter of the first bore section. The two bores 76, 78 provide for a more controlled, plasma discharge flow.

The nozzle base 70 includes an interior, chamfered frusto-conical surface 80 tapering inward toward the bore 60 in a direction away from the electrode. This surface 80 also constricts the arc during torch operation. The upper portion of the nozzle base 70 includes an interior, stepped shoulder 82 dimensioned to engage the ceramic gas baffle 54. The outer surface of the nozzle base includes an annular mounting surface, indicated generally at 84, comprising stepped vertical and horizontal shoulder portions 86, 88. Below the stepped vertical and horizontal shoulder portions 86, 88, a vertical surface 89 extends, followed by an outer, frusto-conical surface 90 tapering downward toward the longitudinal axis in a direction away from the electrode.

The lower nozzle member 72 comprises a cylindrical body portion formed of metallic material, and preferably a free cutting brass. The upper portion of the lower nozzle member includes an annular collar portion 92 dimensioned for an interference fit with the vertical mounting shoulder 86 positioned on the nozzle base. The lower nozzle member includes a plasma discharge opening 62 aligned with the longitudinal axis and positioned adjacent the bore (FIG. 2). A tapered, interior surface 96 is spaced from the outer frusto-conical surface 90 of the nozzle base to form a downwardly, angled water passage 98. The lower nozzle member includes a shoulder portion spaced from the horizontal shoulder portion 88 to form an annular plenum chamber 100 communicating with the water passage 98 through which water is injected from the water passageway 42 and through water jet orifices 102 formed in the collar portion 92 of the lower nozzle member.

The lower nozzle member 72 is configured with an internal vertical shoulder so that a vertical water passage annulus 104 is formed in the water passage defined between the nozzle base and the lower nozzle member. The distance between the nozzle base 70 and the lower nozzle member 72 in the vertical annulus 104 is about 0.003 to about 0.010 inches. A construction having a dimension of about 0.00625±0.00125 inches has been found advantageous. The lower opening 62 has a diameter of between about 0.160 to about 0.170 inches. The distance between the outer, frusto-conical surface of the nozzle base 90 and the interior surface 96 of the lower nozzle member forming the angled portion of the water passage is between about 0.010 to about 0.200 inches.

A ceramic insulator, indicated generally at 110, is secured onto the lower nozzle member and extends substantially along the outer surface of the lower nozzle member. The ceramic insulator prevents double arcing and insulates the lower nozzle member from heat and plasma generated during torch operation. In the embodiment illustrated in FIGS. 1 and 2, the ceramic insulator 110 is glued onto the outer surface of the lower nozzle member. Because the ceramic insulator interior surface does not form a water passage, the ceramic can be manufactured at looser tolerances, thus reducing cost, as compared to prior art torches in which the lower nozzle member is formed from a ceramic material. An O-ring 111 creates a seal between the ceramic insulator and the lower nozzle member to prevent discharged water from passing between the two in those instances in which the glue is not sealing as desired.

The outer cup shield 64 has a lip 112 at its forward end (FIG. 1). The lip 112 engages an annular shoulder 114 on the ceramic insulator and retains the ceramic insulator, lower nozzle member and nozzle based in position against the ceramic gas baffle.

Figure 3:
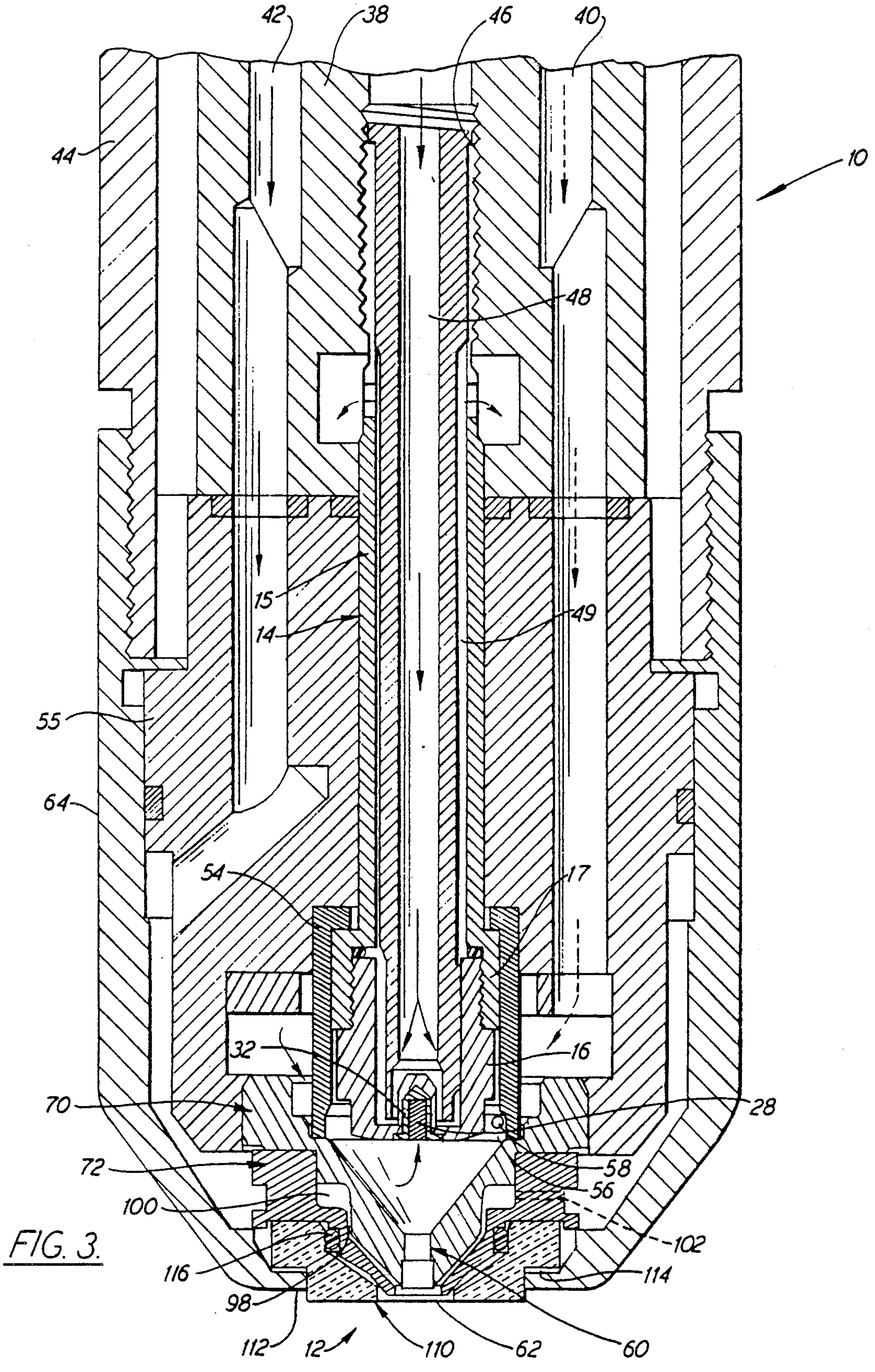
FIG. 3 is a sectioned, side elevation view of a plasma arc torch in accordance with a second embodiment of the invention in which the ceramic insulator is held onto the lower nozzle member by an O-ring.

In a second embodiment illustrated in FIG. 3, the ceramic insulator is held into place by an O-ring 116, which engages a shoulder on the ceramic insulator and the lower nozzle member. The O-ring may be formed from a variety of materials, such as silicone rubber or neoprene. The ceramic insulator is pressed onto the lower nozzle member, which compresses the O-ring to retain the ceramic insulator onto the lower nozzle member. The ceramic insulator can be easily removed once the outer cup shield 64 is removed. The O-ring 116 not only retains the ceramic insulator in place, but also seals between the ceramic insulator and the lower nozzle member to prevent the water from passing between the lower nozzle member and the ceramic insulator.

A power source (not shown) is connected to the torch electrode 14 in a series circuit relationship with a metal workpiece, which typically is grounded. In operation, the plasma arc is established between the emissive insert of the torch 10 and acts as the cathode terminal for the arc. The work piece is connected to the anode of the power supply and positioned below the lower nozzle member. The plasma arc is started in conventional manner by momentarily establishing a pilot arc between the electrode 14 and the nozzle assembly 12. The arc then is transferred to the work piece and is ejected through the arc restricting bore and opening. The arc is intensified, and the swirling vortex of water envelopes the plasma as it passes through the opening.

Because the lower nozzle member 72 is formed of a metallic material and is press fit in close tolerance onto the nozzle base 70, close tolerance concentricities can be held between the diameters of the nozzle base and lower nozzle member. Thus, because of tighter tolerances, the vertical annulus 104 is reduced to about 0.003 to about 0.010 inches, as compared to some other prior art designs in which a vertical annulus has a dimension as high as 0.015±0.0045 inches. This narrow annulus of the present invention serves to smooth out irregularities in the water spray pattern. Additionally, because the narrowed vertical annulus smooths the water spray pattern, the dimensions of the angled water passage 98 and the discharge opening 62 diameter of the lower nozzle member 72 may be optimized for better cut quality. The dimensions may be made larger than other prior art torches to reduce the amount of water drawn into the arc. Because tighter tolerances are now obtainable, larger dimensions are possible without concern for slight irregularities in concentricity, which in larger dimensioned angled water passageways create problems. The smaller prior art dimensions force a greater percentage of water to enter the arc, thus cooling the arc and reducing cutting speed. The present invention allows the angled water passage 98 to be between about 0.010 to 0.020 inches.

The discharge opening 62 of the lower nozzle member 72 may be between about 0.160 to about 0.170 inches in diameter for a 260 amp arc. One prior art torch sets the dimension of the angled water passage at about 0.007 inches and the diameter of the lower nozzle discharge opening at about 0.150 inches when a ceramic lower nozzle member is used.

Additionally, the metallic lower nozzle member allows a finer surface finish to be controlled on the surface defining the water passage as compared to a ceramic component. Thus, the water spray pattern will be more constant and regular with a finer surface cut normally accompanying a metal formed component as compared to a ceramic component.

In the drawings and specification, there has been set forth a preferred embodiment of the invention, and although specific terms are employed, they are used in a generic and descriptive sense only and not for purposes of limitation.

That which is claimed is:

1. A plasma arc torch comprising an electrode defining a discharge end and a longitudinal axis;

a nozzle base formed of a metallic material and mounted adjacent the discharge end of the electrode and having a bore therethrough that is aligned with the longitudinal axis and through which plasma is ejected, said nozzle base having an outer mounting surface generally annular in configuration and which includes stepped vertical and horizontal shoulder portions and an outer frusto-conical surface positioned adjacent the mounting surface and tapering toward the longitudinal axis in a direction away from the electrode;

a lower nozzle member formed of metallic material and including an annular collar portion dimensioned in an interference fit with the vertical shoulder portion, and having a discharge opening aligned with the longitudinal axis and positioned adjacent the bore, and including an outer surface and an interior surface spaced from the outer frusto-conical surface of the nozzle base to form a water passage, and wherein the stepped vertical and horizontal portions form an annular plenum chamber communicating with the water passage and into which water is injected, and the formed water passage including a vertical annulus defined between the nozzle base and the lower nozzle member and wherein the distance between the nozzle base and the lower nozzle member forming the vertical annulus is about 0.003 to about 0.010 inches, and wherein the water passage distance between the outer frusto-conical surface and the interior surface of the lower nozzle member is between about 0.010 to about 0.020 inches;

means for creating an electrical arc extending from the electrode and through the bore and discharge opening to a workpiece located adjacent the lower nozzle member;

means for generating a vortical flow of a gas between the electrode and the nozzle base so as to create a plasma flow outwardly through the bore and discharge opening and to the workpiece;

means for introducing a jet of liquid into the water passage and outward therefrom so as to envelope the plasma as it passes through the bore and discharge opening; and a ceramic insulator secured onto the lower nozzle member outer surface and extending substantially along the outer surface of the lower nozzle member for preventing double arcing and insulating the lower nozzle member from heat and plasma generated during torch operation.

2. A plasma arc torch according to claim 1 wherein the bore comprises a first bore section and a second bore section defining the exit end of the bore and having a diameter greater than the diameter of the first bore section.

3. A plasma arc torch according to claim 1 wherein the nozzle base includes a chamfered frusto-conical interior surface tapering inward toward the bore in a direction away from the electrode.

4. A plasma arc torch according to claim 1 wherein the lower discharge opening has a diameter of between about 0.160 to about 0.170 inches.

5. A plasma arc torch according to claim 1 including a torch body, an outer cup shield mounted on the torch body and including a forward end having a lip and wherein the ceramic insulator includes an annular shoulder and the lip engages the annular shoulder on the ceramic insulator for retaining the ceramic insulator, lower nozzle member and the nozzle base in position.

6. A plasma arc torch comprising:

a torch body;

an electrode including an elongate, metallic tubular holder supported by the torch body and defining a longitudinal axis and front discharge end, the holder having a front face and a cavity formed in the front face along the longitudinal axis, and means mounted in the cavity for emitting electrons upon an electric potential being applied thereto;

a nozzle base formed of a metallic material and mounted adjacent the discharge end of the electrode and having a bore extending therethrough which is aligned with the longitudinal axis and through which plasma is ejected, the nozzle base having an annular mounting surface generally annular in configuration and which includes stepped vertical and horizontal shoulder portions and an outer frusto-conical surface positioned adjacent the mounting surface and tapering toward the longitudinal axis in a direction away from the electrode;

a lower nozzle member formed of metallic material and including an annular collar portion dimensioned in an interference fit with the vertical shoulder portion, and having a lower discharge opening aligned with the longitudinal axis and positioned adjacent the bore, and including an outer surface and including an interior surface spaced from the outer frusto-conical surface of the nozzle base to form a water passage, and wherein the stepped vertical and horizontal portions form an annular plenum chamber communicating with the water passage and into which water is injected, and the formed water passage includes a vertical annulus defined between the nozzle base and the lower nozzle member and wherein the distance between the nozzle base and the lower nozzle member forming the vertical annulus is about 0.003 to about 0.010 inches, and wherein the water passage distance between the outer frusto-conical surface and the interior surface of the lower nozzle member is between about 0.010 to about 0.020 inches;

means for creating an electrical arc extending from the electrode and through the bore and discharge opening to a workpiece located adjacent the lower nozzle member;

means for generating a vortical flow of a gas between the electrode and the nozzle base so as to create a plasma flow outwardly through the bore and opening and to the workpiece;

means for introducing a jet of liquid into the water passage and outward therefrom so as to envelope the plasma as it passes through the bore and discharge opening; and a ceramic insulator secured onto the lower nozzle member outer surface and extending substantially along the outer surface of the lower nozzle member for preventing double arcing and insulating the lower nozzle member from heat and plasma generated during torch operation.

7. A plasma arc torch according to claim 6 wherein the bore comprises a first bore section and a second bore section defining the exit end of the bore and having a diameter greater than the diameter of the first bore section.

8. A plasma arc torch according to claim 6 wherein the nozzle base includes a chamfered frusto-conical interior surface tapering inward toward the bore in a direction away from the electrode.

9. A plasma arc torch according to claim 6 wherein the lower discharge opening has a diameter of between about 0.160 to about 0.170 inches.

10. A plasma arc torch according to claim 6 wherein the ceramic insulator includes an annular shoulder and including an outer cup shield mounted on the torch body, the cup shield including a forward end having a lip engaging the annular shoulder on the ceramic insulator for retaining the ceramic insulator, lower nozzle member and the nozzle base in position.

11. A plasma arc torch according to claim 6 wherein the tubular holder includes a ceramic gas baffle and the nozzle base engages the gas baffle.

12. A plasma arc torch according to claim 6 wherein the means for emitting electrons upon an electric potential being applied thereto includes a generally cylindrical insert positioned within the cavity and disposed coaxially along the longitudinal axis, and wherein the emissive insert is composed of a metallic material having a relatively low work function so as to be adapted to readily emit electrons upon an electric potential being applied thereto.

13. A plasma arc torch according to claim 12 including a sleeve having a peripheral surface bonded to the walls of the cavity.

14. A nozzle assembly adapted for use with plasma arc torches and comprising a nozzle base formed of a metallic material and having a bore defining a longitudinal axis through which plasma is adapted to be discharged, the nozzle base also including an outer mounting surface generally annular in configuration and which includes stepped vertical and horizontal shoulder portions and an outer frusto-conical surface positioned adjacent the mounting surface and tapering toward the longitudinal axis in a direction away from the mounting surface; and a lower nozzle member formed of a metallic material and including an annular collar portion dimensioned in an interference fit with the vertical shoulder portion, and having a lower opening aligned with the longitudinal axis and positioned adjacent the bore, the lower nozzle member including an outer surface and including an interior surface spaced from the outer frusto-conical surface of the nozzle base to form a passage adapted to receive a jet of water therethrough and wherein the stepped vertical and horizontal portions form an annular plenum chamber communicating with the water passage and into which water is injected, and the formed water passage includes a vertical annulus defined between the nozzle base and the lower nozzle member and wherein the distance between the nozzle base and the lower nozzle member forming the vertical annulus is about 0.003 to about 0.010 inches, and wherein the water passage distance between the outer frusto-conical surface and the interior surface of the lower nozzle member is between about 0.010 to about 0.020 inches.

15. A nozzle assembly according to claim 14 including a ceramic insulator secured onto the lower nozzle member and extending substantially along the outer surface of the lower nozzle member for preventing double arcing and insulating the lower nozzle member from heat and plasma when the nozzle assembly is operatively connected to a plasma arc torch.

16. A nozzle assembly according to claim 15 wherein the ceramic insulator is secured by glue onto the lower nozzle member.

17. A nozzle assembly according to claim 16 including an O-ring positioned between the ceramic insulator and the lower nozzle assembly for retaining the ceramic insulator to the lower nozzle assembly.

18. A nozzle assembly according to claim 14 wherein the bore comprises a first bore section and a second bore section that defines an exit end of the bore, the second bore section having a diameter greater than the diameter of the first bore section.

19. A nozzle assembly according to claim 14 wherein the nozzle base includes an interior frusto-conical surface tapering inward toward the bore.

20. A nozzle assembly according to claim 14 wherein the lower discharge opening has a diameter of between about 0.160 to about 0.170 inches.

* * * * *

UNITED STATES PATENT AND TRADEMARK OFFICE

CERTIFICATE OF CORRECTION

PATENT NO. : 5,124,525

DATED : June 23, 1992

INVENTOR(S) : Severance, Jr. et al

It is certified that error appears in the above-identified patent and that said Letters Patent is hereby corrected as shown below:

On the title page: Item ]56] Reference Cited: U. S. Patent Documents, line 3, "4,311,857: should read --4,311,897--.

Column 6, line 14, "0.200" should read --0.020--.

Signed and Sealed this

Second Day of March, 1999

Attest:

Q. TODD DICKINSON

*Attesting Officer* *Acting Commissioner of Patents and Trademarks*